United States Patent [19]
Riquier et al.

[11] Patent Number: 5,265,658
[45] Date of Patent: Nov. 30, 1993

[54] PUNCTURE-PROOF TIRE HAVING A CORE OF ELASTOMERIC MATERIAL

[75] Inventors: Didier Riquier, Persan; Alain Lelievre, Le Mesnil en Thelle, both of France

[73] Assignee: Hutchinson, Paris, France

[21] Appl. No.: 927,236

[22] Filed: Aug. 7, 1992

Related U.S. Application Data

[63] Continuation of Ser. No. 626,190, Dec. 12, 1990, abandoned.

[30] Foreign Application Priority Data

Dec. 14, 1989 [FR] France ............... 89 16544

[51] Int. Cl.$^5$ .................. B60C 7/00; B60C 7/12
[52] U.S. Cl. .................. 152/157; 152/310; 152/314; 152/322
[58] Field of Search ............ 152/310, 314, 317–322, 152/325, 327–329, 157, 165, 521

[56] References Cited

U.S. PATENT DOCUMENTS

| | | | |
|---|---|---|---|
| 642,776 | 2/1900 | Anderson | 152/165 |
| 799,859 | 9/1905 | Magowan | 152/317 |
| 992,904 | 5/1911 | Roberts | 152/314 |
| 1,407,756 | 2/1922 | Kip | 152/317 |
| 1,449,588 | 3/1923 | Connolly | 152/317 |
| 1,520,439 | 12/1924 | Preston | 152/318 |
| 1,643,848 | 9/1927 | Hibbert | 152/322 |
| 2,142,962 | 1/1939 | Conklin | 152/322 |
| 2,213,028 | 8/1940 | Kraft | 152/165 |
| 3,256,123 | 6/1966 | Hart | 152/317 |
| 3,610,308 | 10/1971 | McDonald | 152/521 X |
| 3,739,829 | 6/1973 | Powell et al. | 152/521 |
| 3,946,783 | 3/1976 | Edwards et al. | 152/521 X |
| 4,057,092 | 11/1977 | Tracy | 152/521 X |
| 4,256,158 | 3/1981 | Chautard et al. | 152/521 X |
| 4,340,104 | 7/1982 | Kuan | 152/521 |
| 4,607,675 | 8/1986 | Patitsas et al. | 152/521 |

FOREIGN PATENT DOCUMENTS

| | | | |
|---|---|---|---|
| 334710 | 12/1903 | France | 152/310 |
| 402835 | 5/1910 | France | 152/310 |
| 440082 | 7/1912 | France | 152/310 |
| 0561267 | 10/1923 | France | 152/322 |
| 6808 | 3/1903 | United Kingdom | 152/310 |
| 2092531 | 8/1982 | United Kingdom | |
| 2104457 | 3/1983 | United Kingdom | |

*Primary Examiner*—Michael W. Ball
*Assistant Examiner*—Adrienne C. Johnstone
*Attorney, Agent, or Firm*—Lackenbach Siegel Marzullo Aronson & Greenspan

[57] ABSTRACT

A pressure chamber or core for an unpuncturable pneumatic tire is constituted by a toroidal cushion of elastomer material including mutually independent gastight cells containing a gas under pressure. The cells are substantially all of the same right cross-section, and the area of the right cross-section of any one cell is a small fraction of the area of the right cross-section of the chamber.

4 Claims, 1 Drawing Sheet

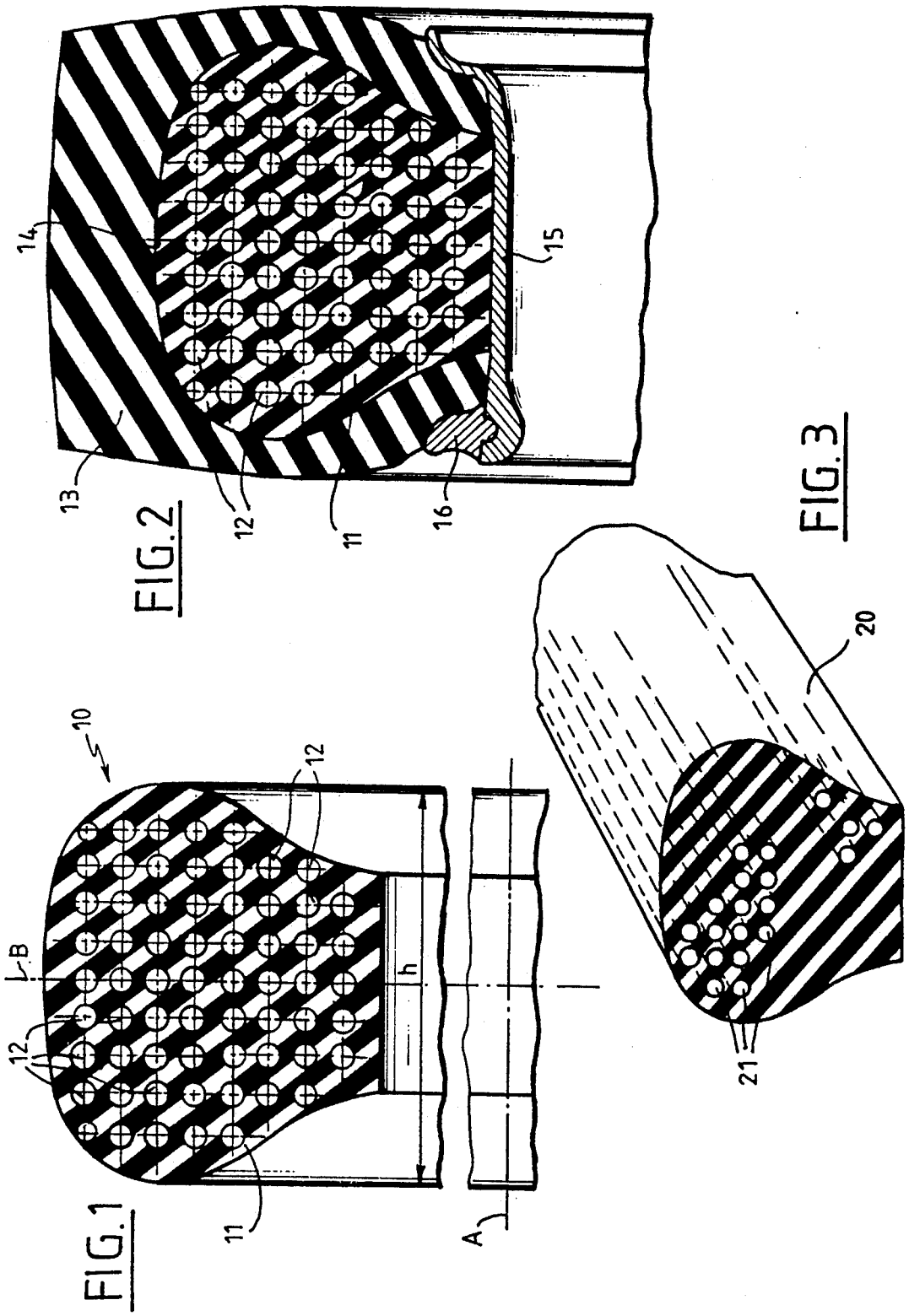

PUNCTURE-PROOF TIRE HAVING A CORE OF ELASTOMERIC MATERIAL

CROSS REFERENCE TO RELATED APPLICATIONS

This application is a continuation of Ser. No. 626,190 filed Dec. 12, 1990, now abandoned.

The invention relates to a pressure chamber or core for an unpuncturable tire, and more precisely to such a chamber of the type constituted by a toroidal cushion or elastomer material containing mutually independent gastight cells each containing a gas under pressure, the toroidal tire core cushion being suitable for associating with a tire carcass of the casing enclosed core type that provides carrying or guidance functions for a moving mass, in particular for a vehicle.

BACKGROUND OF THE INVENTION

Such chambers or cores are designed to be fitted to the wheels of vehicles that are as varied as forklift trucks, earth moving vehicles, baggage-handling tractors, . . . , etc., i.e. vehicles that travel under difficult conditions and must continue to be capable of moving even in the event of the carcase of their tires being punctured, while nevertheless having the running characteristics, and in particular the flexibility, associated with conventional pneumatic tires, with or without inner tubes.

Numerous embodiments of such unpuncturable pressure chambers for tires are already known, and they are described, for example, in British patent number 2 092 531 which describes very accurately the ratio of the area of the cells in such chambers to the cross-section of the chamber.

In addition to the limitations mentioned above, the embodiment of the British patent relates to one type of elastomer only and to very specific dimensions for the length of the chamber relative to the tire in which it is fitted.

The problem therefore arises of providing an unpuncturable pressure chamber for a tire of the type constituted by a toroidal cushion of elastomer material including mutually independent gastight cells containing a gas under pressure, while avoiding the limitations of prior devices and while also being simpler to manufacture than a device constituting an assembly of component parts.

In this respect, an object of the invention is to provide unpuncturable pressure chambers of the type under consideration that can be manufactured using only those materials that are commonplace in the rubber industry and by implementing operations that are likewise well known, so that the chambers can be mass produced at low cost.

SUMMARY OF THE INVENTION

According to the invention, the problem is solved by the facts that the independent gastight cells containing a gas under pressure are substantially all of the same right cross-section, and that the area of the right cross-section of any of the cells is a small fraction of the total right cross-section of the pressure chamber.

In a preferred embodiment, the cells are circular in right cross-section, and said cells are regularly distributed in the volume of the toroidal cushion which is slightly larger in volume than the inside volume of the carcase of the tire to which it is to be fitted, such that the gas (generally air) contained in the cells during manufacture of the pressure chamber is put under pressure when said chamber is assembled inside the tire.

In order to ensure that the walls of each cell in the pressure chamber are lubricated to reduce friction forces and consequently to reduce heating and wear, provision is made, in a manner known per se, to insert a solid lubricant into each of the cells, which lubricant, on melting at a predetermined temperature wets the walls of the cells with a film which is selected to avoid combining with the elastomer from which the cushion is made, thereby avoiding damage it.

BRIEF DESCRIPTION OF THE DRAWING

An embodiment of the invention is described by way of example with reference to the accompanying drawing, in which:

FIG. 1 is a fragmentary cross-section through a pressure chamber of the invention;

FIG. 2 is a view similar to FIG. 1 showing the chamber mounted in a tire; and

FIG. 3 illustrates the method of manufacturing such a pressure chamber.

DETAILED DESCRIPTION

As shown in FIG. 1, an unpuncturable chamber or core 10 invention for a tire on a wheel for carrying or guiding a moving mass is constituted by a toroidal cushion 11 of elastomer material whose right cross-section is close to that of the tire, and includes a multiplicity of mutually independent gastight cells 12 containing a gas under pressure. More precisely, each cell 12 has a right cross-section constituted by a closed curve (advantageously a circle, but this shape is not the only shape possible), thereby forming a toroidal volume about the same axis A as the cushion 11 (which axis is also the axis of the tire carcase 13 suitable for receiving the pressure chamber), with the tire being completely filled between its inside surface 14 and the wheel rim 15, which rim is based, in this case, on a cylinder (no central groove), and which consequently has a removable rim 16 (FIG. 2).

The distribution within the cushion 11 of the toroidal volumes formed by the cells 12 is selected to ensure that the carcase/chamber assembly has good running and moving characteristics, and in particular that it provides flexibility and comfort for the users of vehicles equipped with such assemblies, such as forklift trucks, earthmoving vehicles, self-propelled or towed baggage carts, etc. In the embodiment described and shown, the disposition of the volume is regular, the volumes being distributed in rows and columns and substantially symmetrical about an equatorial plane B, with the right cross-section of each cell being a circle whose diameter is 15 mm, for example, for a chamber of height h (measured parallel to the axis A) of 120 mm, such that the right cross-section of any one cell is about one-fiftieth to one-sixtieth of the total right cross-section of the pressure chamber. Each of the volumes is arranged in both a row and a column, and the volumes are spaced from neighboring volumes in each row and each column by substantially the same distance.

A pressure chamber of the invention is manufactured by using a suitable die to extrude an extrusion of raw rubber 20 which is pierced by longitudinal channels 21. The shape of the extrusion die is the same as the shape of the right cross-section of the cushion to be manufactured. The extrusion is then cut to length and placed in a toroidally-shaped mold so that the two plane end faces of the cut extrusion come into contact with each other. These faces are bonded together and the rubber is vulcanized and then removed from the mold as a cured rubber tire.

The area of the right cross-section of the cushion when manufactured is larger than the area of the right cross-section of the inside chamber as delimited by the rim 15 and the tire carcase 13, and as a result the gas enclosed in the channels 21 which now form the cells 12 is compressed on assembly. The gas is generally air.

A contribution to obtaining good running qualities is also provided, in a manner known per se, by having the wall of each cell lubricated with a substance that does not react with the elastomer, e.g. silicone, which substance is put into place most simply by inserting beads or grains of the substance into the channels 21 prior to welding together the two plane end faces of the lengths of cut up extrusion. The substance should have a melting temperature which is lower than the vulcanization temperature, e.g. about 80° C.

We claim:

1. A vulcanized tire and wheel rim assembly capable of being run even with a punctured tire, comprising a wheel rim;
   a tire carcass having a substantially annular space mounted on said wheel rim; a core for said tire carcass, said core comprising a core cushion of elastomeric material in the shape of a toroid having a cross-sectional shape close to that of said annular space but with a cross-sectional area larger than the cross-sectional area of said space, said core cushion completely filling said annular space of said tire carcass and being compressed therein, said core cushion having formed therein a plurality of toroidal annulus-shaped gas tight cells distributed throughout said core in rows and columns, said rows extending perpendicular to an equatorial plane taken through the wheel rim axis and said columns extending parallel to said equatorial plane, said rows and columns being symmetrically arranged about said equatorial plane, each said cell being arranged in both one of said rows and one of said columns and containing a gas under pressure, wherein said cells are spaced substantially equidistantly from neighboring cells in said rows and columns, said spacing in each row being substantially equal to said spacing in each column.

2. The tire core according to claim 1, wherein said cells are lubricated with a material that does not react with said elastomeric material of the core cushion, and wherein said material having a melting temperature which is lower than the temperature at which said tire core is vulcanized.

3. The tire core according to claim 2, wherein said lubrication material is a silicone.

4. The tire core according to claim 1, wherein each of said cells having a cross-sectional area in the form of a circle, and the ratio of the cross-sectional area of any one cell to the total cross-sectional area of said tire core is from about 1/50 to 1/60.

* * * * *